United States Patent
Komsi

(10) Patent No.: US 6,992,908 B2
(45) Date of Patent: Jan. 31, 2006

(54) METHOD AND ARRANGEMENT FOR CHARGING INTERMEDIATE CIRCUIT OF FREQUENCY CONVERTER

(75) Inventor: Reijo Komsi, Helsinki (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 11/060,570

(22) Filed: Feb. 17, 2005

(65) Prior Publication Data

US 2005/0180185 A1    Aug. 18, 2005

(51) Int. Cl.
*H02M 5/293* (2006.01)

(52) U.S. Cl. .................................................. 363/163

(58) Field of Classification Search ................ 363/157, 363/159, 163, 165
See application file for complete search history.

(56) References Cited

U.S. PATENT DOCUMENTS

| | | | | |
|---|---|---|---|---|
| 4,152,759 A | * | 5/1979 | Hedberg ..................... | 363/160 |
| 4,213,173 A | * | 7/1980 | Link et al. .................. | 363/163 |
| 4,996,718 A | * | 2/1991 | Shiomi ....................... | 455/323 |
| 5,949,672 A | * | 9/1999 | Bernet ........................ | 363/159 |
| 6,014,017 A | * | 1/2000 | Weinhold et al. ........... | 323/207 |
| 6,760,239 B2 | * | 7/2004 | Schierling et al. .......... | 363/132 |

FOREIGN PATENT DOCUMENTS

| | | |
|---|---|---|
| DE | 10013391 A1 | 9/2001 |
| EP | 1363387 A1 | 11/2003 |
| FI | 111671 B1 | 8/2003 |

OTHER PUBLICATIONS

Patent Abstracts of Japan, of JP 04307437 (Toshiba Corporation), dated Jun. 10, 1994, entitled "Power Conversion Apparatus".

* cited by examiner

*Primary Examiner*—Adolf Berhane
(74) *Attorney, Agent, or Firm*—Dykema Gossett PLLC

(57) ABSTRACT

A method and arrangement for charging an intermediate circuit of a frequency converter, the intermediate circuit of the frequency converter comprising one or more capacitors, and the frequency converter having means for charging the intermediate circuit, the means comprising a rectifier bridge, a direct current choke, a direct-current transformer, a zero diode, and a semiconductor switch and a control circuit arranged to control the switch. The method comprises the steps of defining in advance high and low current limits, controlling the semi-conductor switch alternately to conductive and non-conductive states depending on the magnitude of a charging current, and stopping the controlling of the semiconductor switch when the charging current remains below the high current limit.

10 Claims, 2 Drawing Sheets

METHOD AND ARRANGEMENT FOR CHARGING INTERMEDIATE CIRCUIT OF FREQUENCY CONVERTER

BACKGROUND OF THE INVENTION

The present invention relates to a method and arrangement in a frequency converter as described in the preambles of independent claims 1 and 4. In particular, the invention relates to the charging of a capacitor of an intermediate circuit of frequency converters with voltage intermediate circuits.

A frequency converter is a device used to generate an adjustable alternating voltage by using a constant-frequency voltage. The most typical application of frequency converters is controlling motors in such a manner that an adjustable voltage is generated from the alternating voltage of a supply network to control the motor. A frequency converter with a voltage intermediate circuit comprises a rectification unit, voltage intermediate circuit, and inverter unit. A task of the rectification unit is to provide direct voltage from the supplied alternating-current voltage to the voltage intermediate circuit, to which one or more capacitors are connected to store and equalize the direct voltage depending on the power of the device. The inverter unit connects the direct voltage of the voltage intermediate circuit to the load in such a manner that the direct voltage pulses generate the desired average alternating-current voltage or a corresponding adjustable property.

When switching a frequency converter on, the capacitor of the intermediate circuit should be charged before the actual use of the frequency converter. The charging requires a separate charging arrangement that limits the magnitude of the charging current. If the charging current were not limited, the current would increase in magnitude so much that the protective devices in the supply would switch the supply voltage off. Known solutions for charging the capacitor of an intermediate circuit include various charging resistance arrangements, in which the charging current is reduced by a series resistor that is bypassed with a switch after the charging of the intermediate circuit. Another known way is to use a half-controlled bridge circuit, in which the magnitude of the charging current can be controlled by altering the firing angle of the controlled components of the bridge circuit, which requires that the charging arrangement be synchronized with the supply voltage.

A drawback with both above-mentioned known solutions is that the charging arrangements should be dimensioned separately for each frequency converter power. In large MW-power frequency converters or system drives, the charging circuit also becomes quite large and expensive.

BRIEF DESCRIPTION OF THE INVENTION

It is an object of the present invention to provide a method and arrangement that avoid the above-mentioned drawbacks, and permit the charging of the frequency converter intermediate circuit with a similar arrangement regardless of the power range of the frequency converter. This object is achieved by the method and arrangement of the invention that are characterized by what is stated in the characterizing sections of the independent claims.

The invention is based on the fact that the voltage required for charging is generated with a separate rectifier bridge whose output current is directed to the frequency converter intermediate circuit to charge it. The charging current is controlled in such a manner that its value is kept within specific limit values. This way, the charging current is kept under control and does not cause any damage to the components of the frequency converter.

The method and arrangement of the invention provide the advantage that they can be applied to frequency converters of all powers. When applied to frequency converters having different powers and using the same current limits, the charging time varies depending on the magnitude of the capacitance of the frequency converter intermediate circuit. Especially when applied to high-power frequency converters, the method and arrangement of the invention provide significant space and cost savings.

BRIEF DESCRIPTION OF FIGURES

The invention will now be described in greater detail by means of preferred embodiments with reference to the attached drawings, in which.

DETAILED DESCRIPTION OF THE INVENTION

Figure 1:
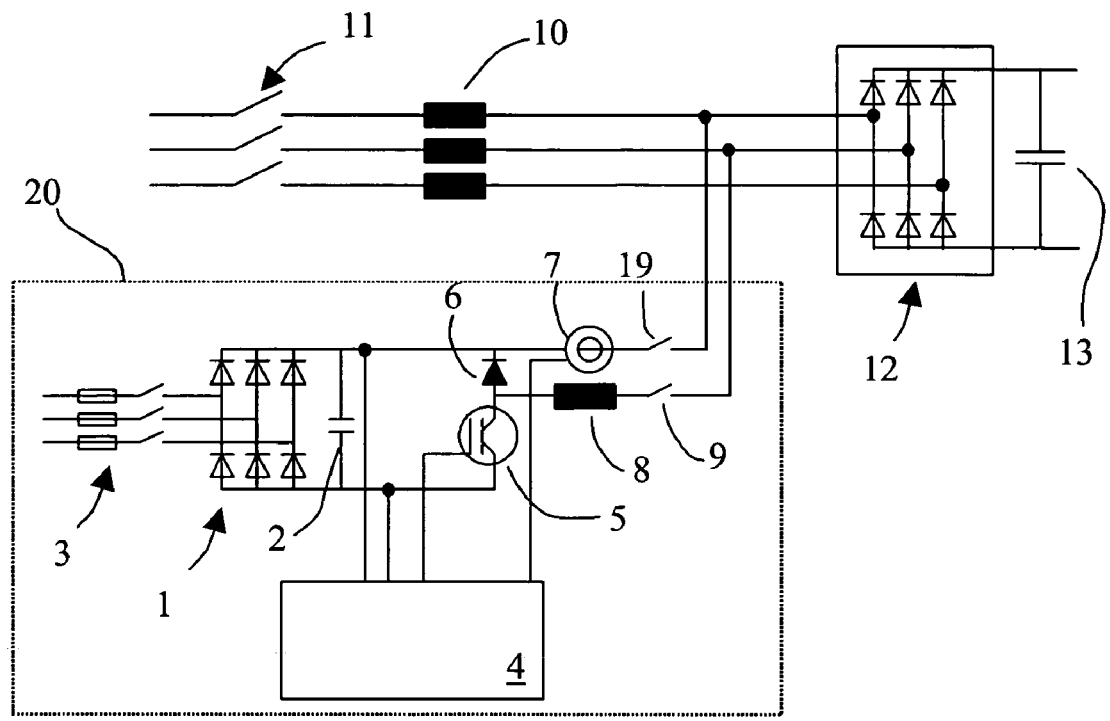
FIG. 1 shows an arrangement of the invention.

FIG. 1 is a general description of the arrangement of the invention. A rectifier 12 made up of the diodes of the frequency converter rectifies a voltage to an intermediate circuit capacitor 13. In normal operation, the rectifier 12 is supplied through chokes 10 and switching devices 11 from the network. When switching the frequency converter on, means 20 connected to the frequency converter in accordance with the invention are used to charge the intermediate circuit.

In the embodiment of FIG. 1, the means 20 for charging the intermediate circuit comprise a rectifier bridge 1, which is specifically a 6-pulse diode bridge, and a capacitor 2 connected to the output of the bridge. A task of the capacitor is to equalize the output voltage of the rectifier bridge. A direct voltage is formed at the output of the diode bridge 1 having a direct-current transformer 7 connected to its positive pole. This direct-current transformer generates a signal proportional to the charging current to a control circuit 4. The control circuit comprises a circuit for performing current measurement, control of the IGBT switch 5, and powering from the intermediate circuit 2.

A semiconductor switch, which in the embodiment of FIG. 1 is an IGBT 5, is connected to the negative pole of the diode bridge output. A DC choke 8 is in series with the switch, and, to a point between these two, an anode of a zero diode 6 is connected, with its cathode connected to the positive pole of the diode bridge output.

The second pole of the DC choke 8 is connected through a switch element 9 to the intermediate circuit of the frequency converter. Similarly, after the direct-current transformer, the positive pole of the diode bridge is connected through a switch element 19 to the intermediate circuit of the frequency converter. The embodiment of FIG. 1 shows how the charging arrangement supplies the capacitor 13 of the frequency converter intermediate circuit through the rectifier 12 of the frequency converter. However, it is clear that the charging unit can be directly connected to the intermediate circuit of the frequency converter.

According to the method of the invention, when charging the intermediate circuit of the frequency converter, a high current limit $I_{hi}$ and a low current limit $I_{lo}$ are defined in advance, and the charging current is maintained within the current range between the two limits during the charging of the capacitor of the intermediate circuit. Further, according to the invention, the semiconductor switch 5 is made conductive to connect the output voltage of the diode bridge to the intermediate circuit of the frequency converter. After the means for charging the intermediate circuit are switched on, i.e. after the switch elements 3 are made conductive, the diode bridge 1 generates in its output a direct-current voltage from the alternating-current voltage of its input, which is typically the voltage of the supply network. The control circuit 4 detects this voltage. FIG. 1 shows how the control circuit is connected to both the positive and negative pole of the diode bridge output to detect this voltage and to generate its own operating voltage.

When the output of the diode bridge is live and the switch element 5 is made conductive, the charging means 20 are connected to the intermediate circuit of the frequency converter through said switch 5, DC choke 8, closed switch 9, and the diode bridge of the frequency converter. Because the intermediate circuit of the frequency converter is dead, the current begins to run from the charging means to the intermediate circuit along the current path that has the direct-current transformer 7, a diode of the frequency converter diode bridge 12, the frequency converter intermediate circuit capacitor 13, a second diode of the frequency converter diode bridge 12, the DC choke 8, and the semiconductor switch 5. As the current runs to the intermediate circuit capacitor 13, the magnitude of this voltage increases.

According to the method of the invention, the direct-current transformer continuously monitors the magnitude of the charging current. Because the frequency converter intermediate circuit capacitor is, in practice, dead when the charging begins, the magnitude of the current increases rapidly, i.e. di/dt is high. When the magnitude of the current defined by the direct-current transformer reaches the high current limit $I_{hi}$, the semiconductor switch is made non-conductive, i.e. the current path described above from the charging unit to the intermediate circuit is disconnected. When the current path is disconnected, the current transfers, due to the DC choke 8, to the zero diode 6, and the current runs along a route that has the DC choke 8, zero diode 6, direct-current transformer 7 and the frequency converter intermediate circuit capacitor 13 through the diodes 12 of the rectifier. While this is the current path, the magnitude of the current begins to decrease. When the current reaches the low current limit, the control circuit 4 controls the switch 5 again to be conductive.

Figure 2:
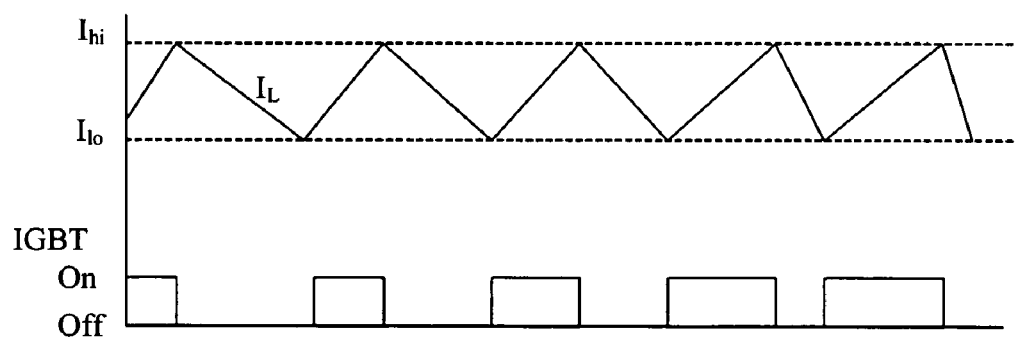
FIG. 2 shows the modulation principle of a method of the invention.

FIG. 2 shows by way of example the behaviour of the charging current $I_L$ depending on the ON/OFF state of the switch component. FIG. 2 shows that when the switch component is conductive, the magnitude of the current increases. When the current reaches the limit $I_{hi}$, the switch component is made non-conductive, whereby the charging current $I_L$ decreases. When the charging current reaches the low limit value $I_{lo}$, the switch component is made conductive again, whereby the magnitude of the charging current increases.

When the voltage of the intermediate circuit has increased to the peak value of the supply voltage, the charging current decreases and the hysteresis control no longer controls the switch component. When the current measured with the control circuit remains below the high limit value, even though IGBT is conductive or when the maximum charging time (e.g. 2.5 s) set for the control circuit 4 is reached, the IGBT controls are stopped and information is transmitted to an upper control system that the charging is finished. This information is transmitted as a digital signal, for instance. The upper control system then decides on closing the main switch device 11. When the switch elements 11 are closed, the intermediate circuit of the frequency converter receives its supply along the route used during operation. As the switch elements 11 are closed, the switch elements 3, 9, 19 can also be opened, whereby the charging means are completely disconnected from both the supply network and the frequency converter. The embodiment of FIG. 1 does not separately show that the same voltage, which typically is the supply network voltage, supplies the charging means 20 and the frequency converter.

Figure 3:
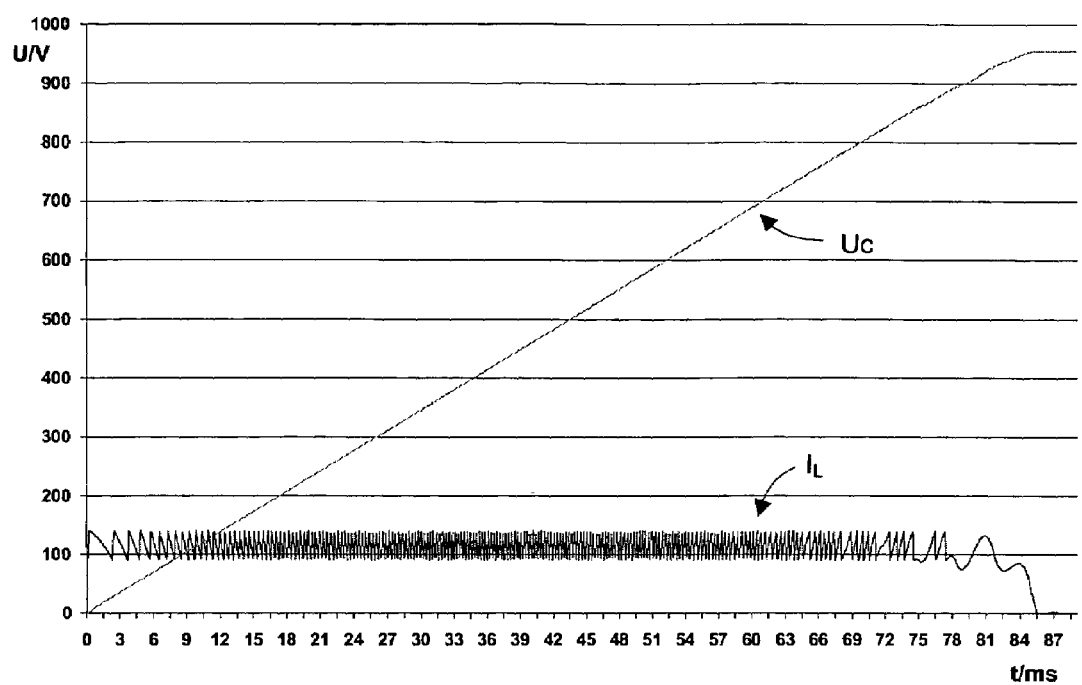
FIG. 3 shows curve shapes of the charging current and intermediate circuit voltage provided by the method and arrangement of the invention.

FIG. 3 shows the curve shapes of the charging current $I_L$ and the voltage of the intermediate circuit capacitor Uc produced by the method of the invention during charging. FIG. 3 is based on charging with a 690-V supply voltage, in which the capacitance of the intermediate circuit being charged is 10 mF. FIG. 3 shows how the charging current varies between 100 A and 140 A, which are the low and high limit values. If the capacitance of the intermediate circuit were higher, the charging would correspondingly take more time. The only variable in the charging is thus the time it takes. If the charging were made with conventional resistance charging, the charging current surge would be over 1000 A. This would considerably stress the charging contactor, and the wiring and protective fuses should be made very large. In addition, the charging time would increase in a conventional implementation, and the charging would necessarily not achieve a full charging level. If the intermediate circuit short-circuits during charging, for instance due to the failure of one of the power semiconductors, the method of the invention limits the short circuit current to the limit value set for the control circuit 4. In addition, the charging is automatically interrupted after the set maximum charging time.

It is apparent to a person skilled in the art that the basic idea of the invention can be implemented in many different ways. The invention and its embodiments are thus not limited to the examples described above, but may vary within the scope of the claims.

The invention claimed is:

1. A method for charging an intermediate circuit in a frequency converter, the intermediate circuit of the frequency converter comprising one or more capacitors and the frequency converter having means for charging the intermediate circuit, wherein the means for charging the intermediate circuit comprise
   a rectifier bridge that comprises an input and an output, the input being connected to supply voltage,
   a direct current choke,
   a direct-current transformer,
   a zero diode, and
   a semiconductor switch and a control circuit arranged to control the switch; the method comprising the steps of
   defining in advance a high current limit and a low current limit
   controlling the semiconductor switch to be conductive for connecting the output voltage of the rectifier bridge to the intermediate circuit of the frequency converter,
   monitoring continuously the magnitude of the charging current running from the rectifier bridge to the intermediate circuit with the direct-current transformer, controlling the semiconductor switch to be alternately conductive and non-conductive depending on the magnitude of the charging current in such a manner that when the charging current decreases to the level of the low current limit, the semiconductor switch is made conductive, whereby the voltage of the rectifier bridge is connected to the intermediate circuit of the frequency converter and the charging current runs through the semiconductor switch and direct current choke, and when the charging current increases to the level of the high current limit, the semiconductor switch is made non-conductive, whereby the voltage of the rectifier bridge is disconnected from the intermediate circuit of the frequency converter and the charging current runs through the zero diode and direct current choke, and stopping the controlling of the semiconductor switch when the charging current remains below the high current limit while the semiconductor switch is conductive.

2. The method as claimed in claim 1, wherein the method comprises the steps of defining the maximum charging time, and stopping the controlling of the semiconductor switch after the maximum charging time is reached.

3. The method as claimed in claim 1, wherein, after the controlling of the semiconductor switch is stopped, information is transmitted to a high control system that the charging is finished.

4. The method as claimed in claim 1, wherein the rectifier bridge is a 6-pulse diode bridge.

5. The method as claimed in claim 1, wherein the semiconductor switch is an IGBT.

6. An arrangement for charging an intermediate circuit in a frequency converter, the intermediate circuit of the frequency converter comprising one or more capacitors, and the arrangement comprising means for charging the intermediate circuit, wherein the means for charging the intermediate circuit comprise a rectifier bridge that comprises an input and an output, the input being arranged to be connected to supply voltage, and the output being arranged to generate a rectified voltage, a semiconductor switch and a control circuit arranged to control the switch, the semiconductor switch being connected to the output of the rectifier bridge on the current path between the rectifier bridge and the frequency converter intermediate circuit for the purpose of opening and closing it, a direct current choke and a direct-current transformer that are connected to the current path between the rectifier bridge and the intermediate circuit, and a zero diode that is connected to generate a zero current path comprising the direct current choke and the direct-current transformer for the charging current when the current path between the rectifier bridge and the intermediate circuit is closed, whereby the control circuit of the semiconductor switch is arranged to control the semiconductor switch in response to the current magnitude defined by the direct-current transformer in such a manner that when the current decreases to the level of a predefined low current limit, the semiconductor switch is made conductive, and when the current increases to the level of a predefined high current limit, the semiconductor switch is made non-conductive, until the charging current remains below the high current limit when the semiconductor switch is conductive, in which case the controlling of the semiconductor switch can be stopped.

7. The arrangement as claimed in claim 6, wherein the control circuit of the semiconductor switch is arranged to stop the controlling of the semiconductor switch when the maximum charging time is reached.

8. The arrangement as claimed in claim 6, wherein the rectifier bridge is a 6-pulse diode bridge.

9. The arrangement as claimed in claim 6, wherein the semiconductor switch is an IGBT.

10. The arrangement as claimed in claim 6, wherein the arrangement also comprises switching devices for disconnecting the charging means from the frequency converter and supply voltage.

* * * * *

UNITED STATES PATENT AND TRADEMARK OFFICE
CERTIFICATE OF CORRECTION

PATENT NO. : 6,992,908 B2  Page 1 of 1
DATED : January 31, 2006
INVENTOR(S) : Reijo Komsi It is certified that error appears in the above-identified patent and that said Letters Patent is hereby corrected as shown below:

<u>Title page,</u>
Insert Item -- [30] Foreign Application Priority Data
FINLAND    20045043    02/18/2004 --.

Signed and Sealed this

Sixteenth Day of May, 2006

JON W. DUDAS
*Director of the United States Patent and Trademark Office*